United States Patent [19]

Hulme

[11] 3,831,011

[45] Aug. 20, 1974

[54] METHOD AND APPARATUS FOR COMPENSATING A MANIFESTATION OF FLUID FLOW FOR TEMPERATURE AND SPECIFIC GRAVITY

[75] Inventor: Jack R. Hulme, Duncan, Okla.

[73] Assignee: Halliburton Company, Duncan, Okla.

[22] Filed: Feb. 28, 1973

[21] Appl. No.: 336,757

[52] U.S. Cl. ........ 235/151.34, 73/194 E, 235/92 FL
[51] Int. Cl. ........................... G06f 15/46, G01f 1/08
[58] Field of Search ........ 235/151.34, 92 FL, 151.3, 235/150.52; 73/194 R, 194 E

[56] References Cited
UNITED STATES PATENTS

| | | | |
|---|---|---|---|
| 3,315,524 | 4/1967 | Duffy et al. ........................ | 73/194 X |
| 3,566,685 | 3/1971 | Zimmerman et al. ...... | 235/151.34 X |
| 3,588,481 | 6/1971 | Stroman ......................... | 235/151.34 |
| 3,610,898 | 10/1971 | Yamamoto et al. ........... | 235/151.34 |
| 3,614,892 | 10/1971 | Ottenstein ................. | 235/151.34 X |
| 3,688,573 | 9/1972 | Garrett ............................. | 73/194 R |

Primary Examiner—Malcolm A. Morrison
Assistant Examiner—Jerry Smith
Attorney, Agent, or Firm—Burns, Doane, Swecker & Mathis

[57] ABSTRACT

A method and digital apparatus for correcting a manifestation of fluid flow for variations in the temperature of the fluid and for the specific gravity of the fluid to produce an indication of the volume of the fluid corrected to a predetermined temperature. A digital signal representing the sensed temperature is modified as a function of the specific gravity of the fluid and thereafter subtracted from a predetermined digital signal during a series of time intervals each commenced responsively to a unit of flow.

11 Claims, 6 Drawing Figures

METHOD AND APPARATUS FOR COMPENSATING A MANIFESTATION OF FLUID FLOW FOR TEMPERATURE AND SPECIFIC GRAVITY

BACKGROUND OF THE INVENTION

The need for compensating the output signal of fluid flowmeters for variable physical conditions of the fluid such as composition, density, pressure, temperature and the like has long been recognized. Among these methods have been mechanical, electro-mechanical, and electrical systems for integrating the output signal from a flowmeter corrected by an output signal from a condition responsive transducer to yield a flowmeter reading compensated for a condition of the fluid.

One such system is illustrated in U.S. Pat. No. 3,699,320 issued Oct. 17, 1972, to Carl W. Zimmerman and George V. Copland and assigned to the assignee hereof. In the Zimmerman et al system, fluid flow responsive pulses are utilized to gate packets of fluid condition responsive pulses to appropriate scaling and counting apparatus, the number of packets being thus related to flow and the number of pulses in each packet being related to a variable condition of the fluid. The number of pulses accumulated are thus related to flow as compensated for the volumetric expansion and contraction of the fluid due to the temperature thereof.

In the monitoring of a fluid such as treated crude oil, there are, however, at least two physical conditions of the fluid for which it is desirable to compensate the fluid flow measurement to obtain a more accurate measurement of fluid volume. One of these conditions may be a relatively constant physical condition, e.g., the specific gravity of the fluid to be monitored, while the other condition may be a rapidly variable physical condition such as the temperature of the fluid.

The accurate metering of crude oil for custody transfer or lease allocation requires that the product volumes metered under various temperature conditions be corrected to a standard temperature, usually 60° F., to compensate for the volumetric expansion and contraction of the oil with temperature. For an accurate temperature correction, the specific gravity of the oil must be taken into account so that the appropriate temperature coefficient of expansion may be employed in the volumetric correction. Tables of multipliers for performing such conversion have been published. These multipliers are essentially linear functions of temperature when plotted over the range of specific gravities and temperatures customarily found in crude oil production.

In systems such as described in the aforementioned Zimmerman et al. patent, the scaling factors must be individually adjusted for the specific gravity of each fluid monitored if the monitored volume is to be corrected for the proper temperature coefficient of expansion for that particular fluid. It will be appreciated that the setting of the scalers is time consuming and is made more difficult if adjustments cannot be made at a single convenient location such as from the face of a control panel.

It is accordingly an object of this invention to obviate the deficiencies of the prior art by providing a novel and convenient method and apparatus for quickly adjusting a fluid flowmeter system to accommodate petroleum products with different thermal expansion characteristics.

It is another object of this invention to provide a novel method and apparatus for automatically correcting metered volumes for temperature at the temperature coefficient of expansion of the monitored fluid.

It is still another object of the present invention to provide a novel method and apparatus for correcting a fluid flow signal for two physical conditions of the fluid being monitored, one physical condition being a relative constant and the other physical condition being widely variable.

Although flowmeters have been equipped with mechanical temperature ture compensating devices, the volumes recorded by these devices may not be corrected for differing thermal expansion characteristics of different products. Moreover, such mechanical devices generally have a slow response to temperature changes and are thus unsuitable for the measurement of intermittent flow or the small quantities of fluid typical in a time-sharing of net oil analyzers among several leases for the allocation of oil production.

Where, for example, several oil/water separators discharge liquid sequentially through the same net oil analyzer, the output signal pulses representing volume are diverted to the appropriate lease registers. Since the volume of liquid discharged during each separate dump may be as little as two barrels discharged typically in about one minute, the dumps may occur in rapid succession. Moreover, successive discharges from different separators fed to the same net oil analyzer may vary in temperature by as much as 30° F, such that the mechanical device cannot follow the changes. Additionally, separators receiving fluid from a low production well may permit cooling of the fluid while accumulating enough fluid to actuate the dump control. Volumetric metering errors of several percent in the net oil volume can thus occur. It will thus be appreciated that in many of the prior art net oil analyzing systems, long time constant compensating systems are used which are not only incapable of following the temperature of the intermittent flow but may also produce less accurate results than if no compensation is attempted.

It is accordingly a further object of the present invention to provide a novel fast response digital method and system for compensating volumetric liquid flow measurements for variations in temperature for fluids having different thermal coefficients of expansion.

These and many other objects and advantages of the present invention will be apparent from the claims and from the following detailed description when read in conjunction with the appended drawings.

THE DRAWINGS

THE DETAILED DESCRIPTION

Figure 1:
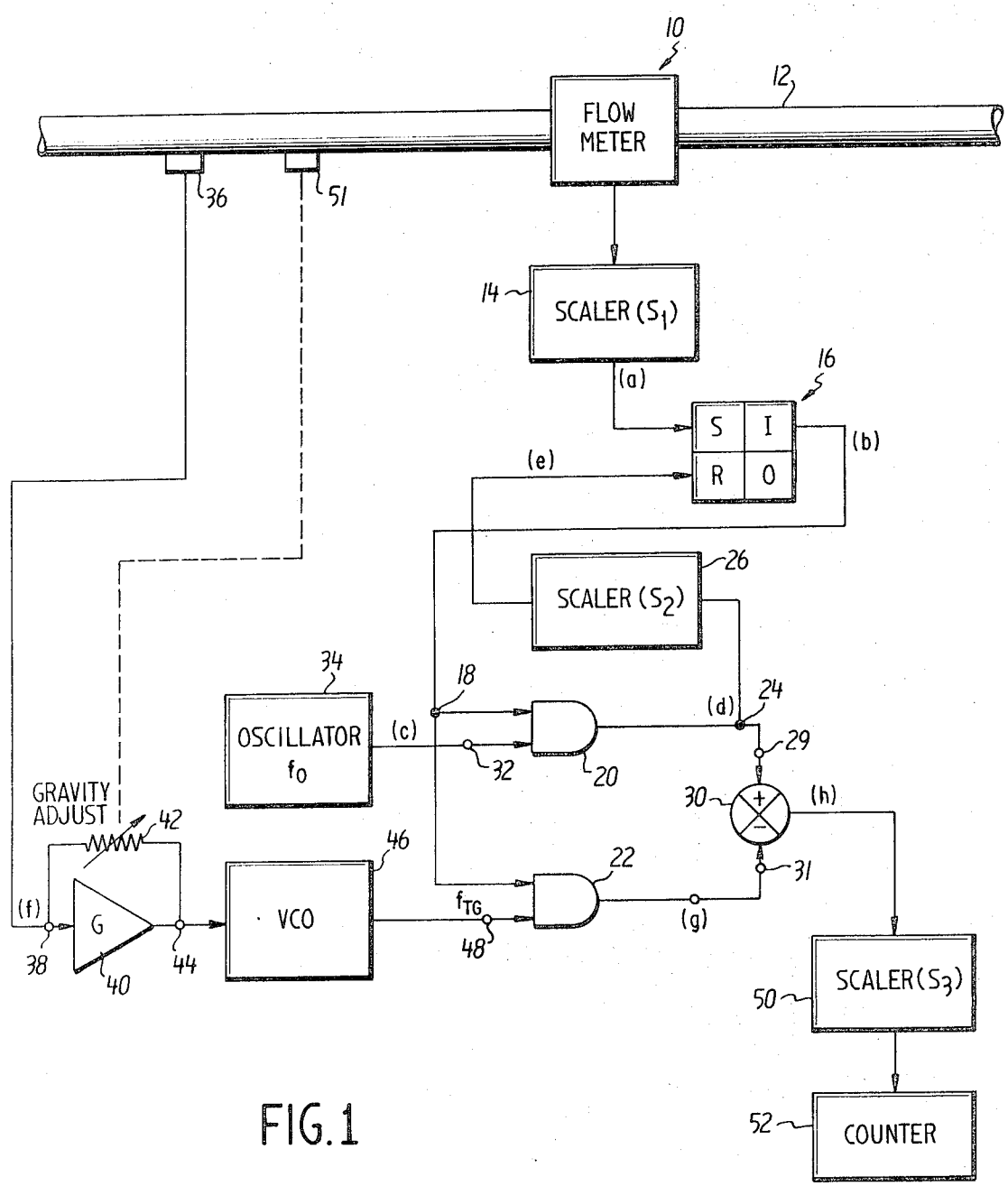
FIG. 1 is a functional block diagram of a preferred embodiment of the present invention.

With respect to FIG. 1, the circuit of the present invention produces packets of pulses wherein the number of packets is related to fluid flow and the number of pulses in each packet is related to a condition of the fluid by which the digital output signal from the flowmeter is to be modified.

For this purpose, a flowmeter 10 may be provided in a fluid conduit 12 through which the fluid to be measured may flow. The flowmeter 10 may be conventional in its circuitry and operation and may, for example, be of the type described and claimed in U.S. Pat. No. 3,164,020 to Edward Groner et al. and assigned to the assignee of the present invention. Alternatively to the turbine mass flowmeter illustrated and claimed in the referenced patent, a suitable positive displacement meter may be employed.

The output signal from the flowmeter 10 may be a series of pulses occurring at a frequency or pulse repetition rate related to the rate of fluid flow. While not shown, these pulses may be accumulated in a suitable conventional counter as an indication of gross fluid flow. These pulses may also be shaped as desired prior to their application to the counter (not shown) by a suitable conventional circuit.

The output signal from the flowmeter 10 may be applied to a suitable conventional scaler 14 having a scaling factor $S_1$. The scaler 14 may be conventional both in circuitry and operation and may, by way of example, comprise a conventional counter circuit with a number of binary elements or flip-flops serially connected so as to provide a single output pulse in response to the application of a predetermined number $S_1$ of input pulses.

The scaler 14 output signal may be applied to the set input terminal S of a conventional bistable multivibrator or flip-flop 16. The "true" or binary "one" output terminal of the flip-flop 16 may be directly connected to an input terminal 18 of each of a pair of two input terminal AND gates 20 and 22. The output terminal 24 of the AND gate 20 may be connected through a suitable conventional scaler 26 having a scaling factor $S_2$ to the reset input terminal R of the flip-flop 16. The output terminal 24 of the AND gate 20 may also be connected to a positive input terminal 29 of a suitable conventional subtractor circuit 30. The subtractor circuit 30 may, for example, be of the type illustrated and claimed in U.S. Pat. No. 3,569,830 issued Mar. 9, 1971, to Edward W. Gass et al., and assigned to the assignee hereof.

The other input terminal 32 of the AND gate 20 may be directly connected to the output terminal of a suitable conventional oscillator 34 having a fixed frequency or pulse repetition rate $f_0$.

Also disposed in the conduit 12 and in operative contact with the fluid flowing therethrough may be a suitable conventional condition responsive transducer 36. The output signal from the transducer 36 may be an analog voltage having an amplitude to a condition of the fluid flowing through the conduit 12. This signal may be applied to an input terminal 38 of a conventional variable gain d.c. amplifier 40, the gain of which may be varied by the manual adjustment of a potentiometer 42 in the feedback path thereof. The variable gain d.c. amplifier 40 may have an output terminal 44 connected through a suitable conventional voltage controlled oscillator 46 to the second input terminal 48 of the AND gate 22 to thereby provide thereto a series of pulses having a frequency or repetition rate related to the amplitude of the analog condition responsive signal.

The output signal from the AND gate 22 may be applied to a negative input terminal 31 of the subtractor 30 and the output signal from the subtractor 30 applied through a conventional scaler 50 having a scaling factor $S_3$ to a suitable conventional digital counter 52 to thereby provide a manifestation of fluid volume. The manifestation of fluid volume may be corrected to a standard temperature by the sensing of the temperature of the fluid by the transducer 36 and by the manual or automatic adjustment of the gain of the variable gain d.c. amplifier 40 as a function of the specific gravity of the fluid. The counter 52 may, for example, be the HECON series FR-967, commercially obtainable from Hengstler Numerics, Inc. of Palisades Park, N.J.

It is a significant feature of the present invention that the scalers 14, 26 and 50 may have their respective scaling factors $S_1$, $S_2$ and $S_3$ preset and left in the preset condition without further adjustment thereto, regardless of the specific gravity of the fluid in the conduit 12. In one operative embodiment, the scaler 14 may have a scaling factor such that the scaling factor $S_1$ is 1,024, the scaling factor $S_2$ is 4,608 and the scaling factor $S_3$ is 4. In the illustrated embodiment, the oscillator 34 has an output signal frequency of 4,608 Hz and the voltage controlled oscillator 46 biased to provide an output signal frequency of 512 Hz for a standard fluid temperature of 60° F.

Figure 2:
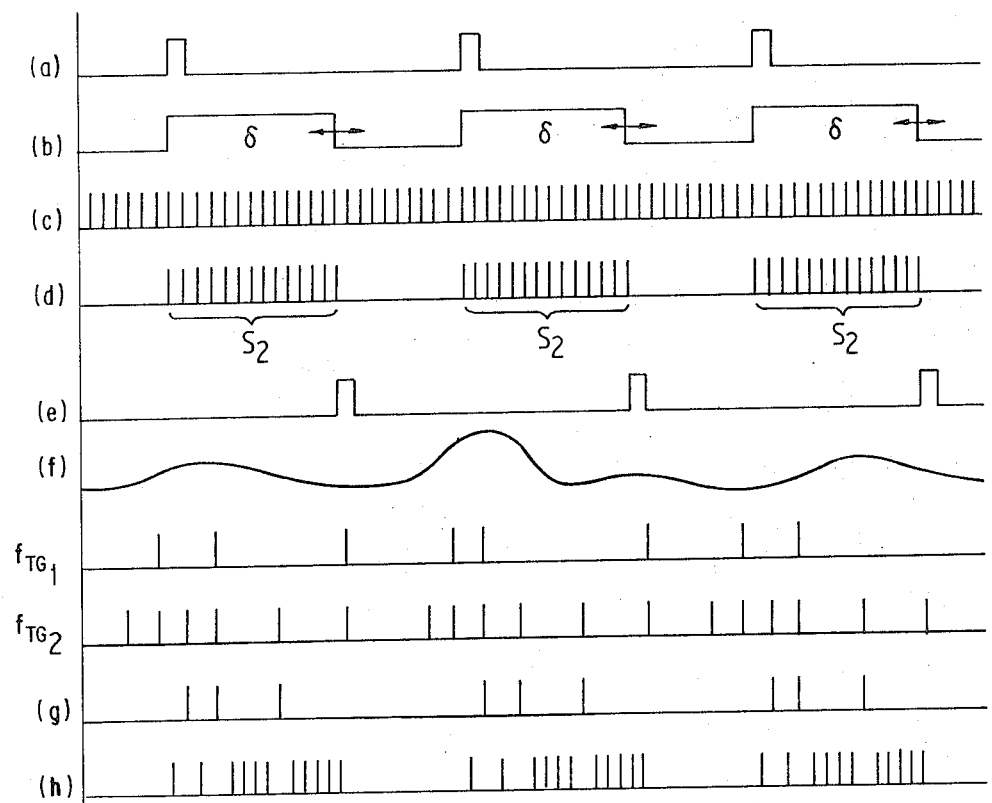
FIG. 2 is a timing diagram illustrating waveforms at various places in the circuit of FIG. 1.

The operation of the circuit of FIG. 1 may be more easily understood with reference to the waveforms of FIG. 2. With reference to FIG. 2, the output signal of the scaler 14 is illustrated as waveform (a). Responsively to the leading edge of each of the sloped pulses in waveform (a), the flip-flop 16 is set to provide a positive output pulse having a duration δ as is illustrated by waveform (b) in FIG. 2.

The fixed frequency output signal from the oscillator 34 is illustrated in waveform (c) and is applied through the AND gate 20 to the scaler 26. When the scaler 26 has accumulated 4,608 pulses, the flip-flop 16 is reset by a pulse in waveform (e) to terminate the positive pulse of waveform (b). Because the frequency of the oscillator is contant, the duration δ of the gating pulses in waveform (b) is also a constant.

The bistable multivibrator 16, oscillator 34, gate 20 and scaler 26 may thus function together as a monostable multivibrator which is triggered by each flow response pulse from the scaler 14 to provide a gating pulse having a predetermined duration as determined by the time interval necessary to accumulate the predetermined number of fixed frequency pulses from the oscillator 34 in the scaler 26.

Since the scaling factor $S_2$ of the scaler 26 determines the number of pulses in each packer of the waveform (d), and since waveform (d) is applied to the positive input terminal of the subtractor 30, the number of pulses applied to the positive input terminal of the subtractor is flow-related, i.e., the number of flowmeter 10 pulses multiplied by the scaling factor $S_2$ and divided by the scaling factor $S_1$.

The pulse repetition rate of the pulses in the output signal of the voltage controlled oscillator 46 may be continuously variable in response to a variable physical condition of the fluid, such as temperature. The pulse repetition rate is also affected by the gain of the variable gain d.c. amplifier 40 such that, in the illustrated embodiment, the frequency $f_{TG}$ of the output signal from the voltage controlled oscillator 46 is related both to the temperature T sensed and the gain G of the variable gain d.c. amplifier 40.

As will be described hereinafter, the voltage controlled oscillator 46 may be considered as having an ouput frequency response K to a change in temperature which is directly related to the gain G of the variable gain d.c. amplifier 40 such that:

$$K = kG \qquad (1)$$

where $k$ is the temperature response characteristic of the transducer 36.

As will be described, by the modification of the gain of the variable gain d.c. amplifier 40, the output signal frequency of the voltage controlled oscillator 46 may be directly related to the temperature of the fluid in the conduit 12 corrected for, or modified by, the temperature coefficient of expansion of the fluid. Thus, the frequency of the output signal of the variable frequency oscillator can be set by the gain of the amplifier 40 such that for any fluid at the standardized temperature accepted by the American Petroleum Institute (API), i.e., 60° F, the oscillator output signal frequency will be fixed. Therefore, the relationship between the output signal frequency of the voltage controlled oscillator and the various scaling factors will remain constant in that the scaling value of the scalers need not be changed for different fluids.

With continued reference to FIG. 2, the output signal from the transducer 36 applied to the input terminal 38 of the variable gain d.c. amplifier 40 is illustrated as waveform $(f)$. This signal may be amplified in accordance with the gain of the variable gain d.c. amplifier 40 such that for a gain $G_1$ the waveform $f_{TG_2}$ may be obtained as the output signal from the voltage controlled oscillator 46. For a larger gain $G_2$, the output signal from the voltage controlled oscillator 46 may be such as that illustrated by the waveform $f_{TG_2}$. Thus, the number of pulses generated by the voltage controlled oscillator 46 over a given period of time is directly related to the sensed temperature and also to the gain of the variable gain d.c. amplifier 40.

It can be seen that the pulse recurrence or repetition rate of the pulses in the output signal from the voltage controlled oscillator 46 may be variable both in response to a variable condition of the fluid, e.g., temperature, and a constant physical condition of the fluid, such as specific gravity or temperature coefficient of expansion of the fluid in the conduit 12.

The output signal from the variable frequency oscillator 46 is applied to the AND gate 22 and is gated on for a time period $\delta$ concurrently with the enabling of the gate 20, earlier described. The pulses available at the output terminal of the voltage controlled oscillator 46 may thus be passed through the AND gate 22 during the enabling thereof to be subtracted from the constant number of pulses in the pocket which defines the gating interval.

For purposes of illustration, assume that the waveform $f_{TG_2}$ is applied to the input terminal 48 of the AND gate 22. The output signal from the AND gate 22 is illustrated as the waveform $(g)$ in FIG. 2 and is applied to the negative input terminal 31 of the subtractor 30. in the configuration shown, the signal of waveform $(g)$ is subtracted from the signal of the waveform $(d)$, such that the output signal from he subtractor 30 illustrated as waveform $(h)$ is applied through the scaler 50 to the counter 52.

Figure 3:
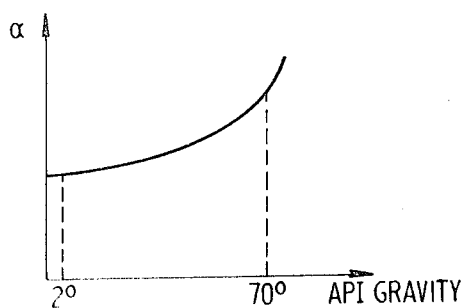
FIG. 3 is a graph of the temperature coefficient of expansion of a fluid such as oil with respect to API gravity.

Referring now to FIGS. 3–6 and assuming that the fluid in the conduit 12 is a hydrocarbon having g a known (American Petroleum Institute) gravity, the temperature coefficient of expansion $\alpha$ of the fluid may be directly related to the API gravity as illustrated in FIG. 3. Thus, for different fluids the temperature coefficient of expansion thereof may be easily ascertained.

Figure 4:
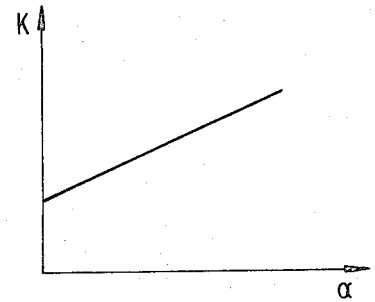
FIG. 4 is a graph of the frequency response of the voltage controlled oscillator of FIG. 1 with respect to the temperature coefficient of expansion of the monitored fluid.

The relationship of the change in output signal frequency per degree of temperature change, K, is substantially linear with respect to the temperature coefficient of expansion of the fluids which may be carried by the conduit 12 as is illustrated in FIG. 4.

Figure 5:
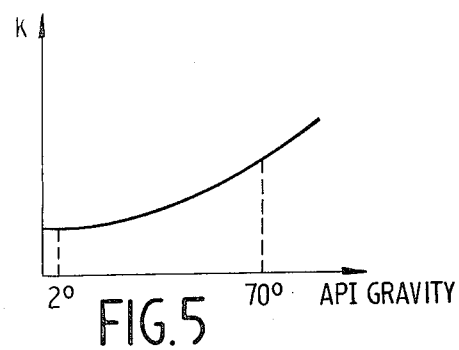
FIG. 5 is a graph of the frequency response of the voltage controlled oscillator of FIG. 1 with respect to API gravity; and, FIG. 6 is a graph of the frequency response of the voltage controlled oscillator of FIG. 1 with respect to temperature.

Since the rate of change K of frequency with respect to temperature may be related to the thermal coefficient of expansion $\alpha$ it will be appreciated that K may also be related to the API gravity of the fluid in the conduit 12 and thus to the identity of the fluid as illustrated in FIG. 5. By the appropriate selection of the thermal response K of the variable frequency oscillator 46 to the known fluid in the conduit 12, the compensation of the flowmeter pulses may be easily accomplished. By the selection of K by the modification of the gain G of the variable gain d.c. amplifier, the ratio $K/\alpha$ may be maintained constant such that the total number of pulses accumulated in the counter 52 will reflect fluid flow corrected for the temperature coefficient of the fluid monitored without the necessity for modification of the scaling factors of any of the scalers 14, 26 and 50.

Figure 6:
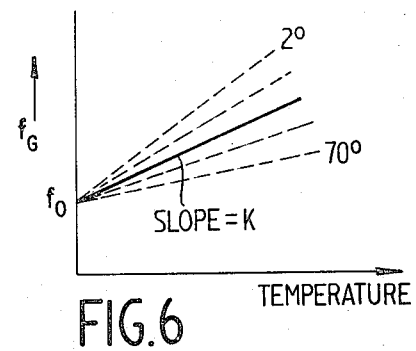

Referring now to FIG. 6, the slope K of Equation $(l)$, i.e., the frequency versus temperature curve of the voltage controlled oscillator 46, may be varied by varying the gain of the variable gain d.c. amplifier 40. Since the frequency of the voltage controlled oscillator 46 $f_{TG}$ equals $f_o - K/\alpha$, then all that is necessary to maintain the output signal from the voltage controlled oscillator 46 normalized is to maintain the ratio $K/\alpha$ constant. This may be done by the selection of K (by setting G) for the value of $\alpha$ calculated from the API gravity of the fluid in the conduit 12.

Thus, the output signal from the transducer 36 may not only be normalized to a fixed standard temperature, e.g., 60° F in the API system, but also compensated for the thermal coefficient of expansion of the fluid temperature sensed. In other words, the temperature responsive transducer output signal may be modified by the gain of the amplifier 40 so that a control signal is produced at the output terminal 44 which is a signal related to the temperature of the fluid corrected for the thermal coefficient of expansion of the fluid.

Referring again to the circuit of FIG. 1, the number of pulses $N_c$ counted by the counter 52 may be given by:

$$N_c = N\, S_2/S_1\, S_3\, [1 + (f_o - K/\alpha + K(T - T_o))/f_o]$$

(2)

where:
- $N$ = number of flowmeter 10 pulses;
- $N_c$ = compensated number of flowmeter 10 pulses;
- $S_1, S_2, S_3$ = scaling factors of scalers 14, 26 and 50 respectively;
- $f_o$ = frequency of the oscillator 34;
- *characteristic* = temperature response characteristic of the voltage controlled oscillator 46 (i.e., $K = kG$ where $k$ is the temperature response characterisitc of the transducer 36 and $G$ is the gain of the amplifier 40);
- $\alpha$ = temperature coefficient of expansion of the fluid monitored;
- $T$ = temperature sensed; and,
- $T_o$ = standard temperature, e.g., 60° F.

From Equation (2) it can be seen that a quantity less than 1 is multiplied by a scaled number of flowmeter pulses. Since $f_o$ is held constant $\alpha$ is a constant for a given fluid, the number of pulses $N_c$ will depend solely on T with a constant correction factor of $(f_o - K/\alpha)$ added to the temperature term. Thus, to keep Equation (2) balanced, so that the number of pulses $N_c$ will be correct for a change in $\alpha$, some additional term in Equation (2) must also change. Rather than changing scaling factors, the term K is varied by appropriately varying the gain G.

Thus, the term $(1 - (f_o\ K/\alpha + k(T - T_o)/f_o)$ will depend only on T and will be correct for the expansion coefficient $\alpha$ without having to change $S_1$, $S_2$ or $S_3$ if the term K is selected by reference to the graph of FIG. 5. Since $K = kG$ (Equation (1)), the gain G may be obtained once K has been computed and the transducer constant is known. Tables may be provided so that an operator need only ascertain the API gravity of the fluid monitored and set the gain G accordingly. The gain setting variation may, of course, be automatically accomplished if the API gravity is represented by a signal.

As earlier indicated, the adjustment of the gain of the amplifier 40 of FIG. 1 may be automatically achieved. As illustrated schematically in FIG. 1, a transducer 51 disposed in the conduit 12 may be utilized to sense the specific gravity of the fluid flowing therethrough to provide a continuous and automatic adjustment of the gain of the amplifier 40.

ADVANTAGES AND SCOPE OF THE INVENTION

From the foregoing, it would be readily apparent that the method and apparatus of the present invention provides for the manual or automatic compensation of a volumetric manifestation of fluid flow for both a variable physical condition of the fluid such as temperature and for a relatively constant factor which influences the variable physical condition such as the coefficient of temperature expansion of the fluid. Through the utilization of the present invention, the various scalers utilized in generally known systems to achieve a direct manifestation of fluid flow compensated for the temperature and temperature coefficient of fluid need not be modified. A substantial economy in time and money in effecting the modification is thereby achieved.

The present invention may be embodied in other specific forms without departing the spirit or essential characterisitc thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method of compensating a fluid flow signal for the temperature and the temperature coefficient of expansion of the fluid comprising the steps of:
   a. providing a first signal having a pulse recurrence rate related to fluid flow;
   b. providing a second signal related to the temperature of the fluid;
   c. selectively modifying the relationship between said second signal and the temperature of the fluid as a function of the specific gravity of the fluid to provide a third signal having a pulse recurrence rate related to the temperature of the fluid and the temperature coefficient of expansion of the fluid;
   d. providing a fourth signal having a predetermined pulse recurrence rate; and,
   e. subtracting the number of pulses in said third signal from the number of pulses in said fourth signal during a series of time intervals of predetermined duration each commenced responsively to a pulse in said first signal to thereby provide a fluid flow signal compensated for the temperature and the temperature coefficient of expansion of the fluid.

2. The method of claim 1 wherein said second signal is an analog signal; and,
   wherein said second signal is modified by selectively amplifying said second signal as a function of the specific gravity of the fluid and thereafter providing said third signal related in pulse recurrence rate to the amplitude of said amplified signal.

3. The method of claim 2 wherein the predetermined duration of each of the time intervals is determined by the accumulation of a predetermined number of pulses in said fourth signal following a pulse in said first signal.

4. Apparatus for monitoring fluid flow comprising:
   means for providing a first signal having a pulse recurrence rate related to fluid flow;
   means for providing a second signal having a pulse recurrence rate related to physical condition of the fluid being monitored;
   means for selectively modifying the relationship of the pulse recurrence rate of said second signal to said physical condition;
   means for providing a third signal having a predetermined pulse recurrence rate;
   means responsive to said first, second and third signals for providing packets of pulses, the number of pulses in each packet being related to the difference between the number of pulses in said second and third signals during a time interval of predetermined duration and the number of packets being related to the number of pulses in said first signal; and,
   means for accumulating the number of pulses in a plurality of successive packets of pulses.

5. The apparatus of claim 4 including:
means for counting the pulses in said third signal which are generated subsequent to a pulse in said first signal; and,
means responsive to pulse counting means for terminating the time intervals during which said packets of pulses are provided.

6. The apparatus of claim 5 wherein the physical condition to which said second signal is related is the temperature of the fluid; and,
wherein the relationship between the number of pulses in said second signal and temperature is selectively modified as a function of the specific gravity of the fluid.

7. The apparatus of claim 4 wherein the physical condition to which said second signal is related is the temperature of the fluid; and,
wherein the relationship between the number of pulses in said second signal and temperature is selectively modified as a function of the specific gravity of the fluid.

8. Apparatus for compensating a fluid flow measuring system comprising:
means for producing a first signal related to gross fluid flow;
means for providing a second signal related by a multiple to a variable physical condition of the fluid;
means for producing a third signal having a predetermined pulse repetition rate;
means for algebraically combining said third signal with said first signal to prvide a combined signal; and,
means for reducing said combined signal by said multiple to thereby provide a fluid flow signal compensated for the variable physical condition of the fluid.

9. The apparatus of claim 8 wherein the variable physical condition to which said second signal is related is the temperature of the fluid; and,
including means for modifying the relationship between said second signal and the temperature of the fluid as a function of the specific gravity of the fluid.

10. Apparatus for compensating fluid flow for a variable physical condition comprising:
means for providing a first signal having a pulse recurrence rate related to fluid flow;
means for providing a second signal having a pulse recurrence rate related to a variable physical condition of the fluid;
means for providing a third signal having a predetermined pulse recurrence rate;
a counter; and,
gate means responsive to the pulses in said first signal to supply packets of pulses to said counter in a time interval related to the accumulation of a predetermined number of pulses in said third signal,
the pulse recurrence rate of said third signal being greater than the maximum pulse recurrence rate of said second signal,
the number of pulses supplied to said counter being the same as the number of pulses in said first signal at the value of the variable physical condition of the fluid for which no compensation of fluid flow is desired, and
the number of pulses in said third signal being related to the mathematical sum of (a) the number of pulses in said second signal at the value for which no compensation of fluid flow is desired, and (b) the number of pulses in said first signal.

11. The apparatus of claim 10 including:
means for counting the pulses in said third signal which are generated subsequent to a pulse in said first signal; and,
means responsive to said pulse counting means for terminating the time intervals during which said packets of pulses are provided.

* * * * *

UNITED STATES PATENT OFFICE
CERTIFICATE OF CORRECTION

Patent No. 3,831,011            Dated August 20, 1974

Inventor(s) Jack R. Hulme

It is certified that error appears in the above-identified patent and that said Letters Patent are hereby corrected as shown below:

Col. 2, line 14, after the word temperature, delete "ture"

Col. 3, line 67, after the word amplitude, insert --related--

Col. 4, line 54, delete the word "contant" and substitute therefor the word --constant--

Col. 5, line 46, delete "$f_{TG_2}$" and substitute therefor --$f_{TG_1}$--

Col. 6, line 15, after the word having delete the letter "g"

Col. 6, line 16, after the word known, insert --API--

Col. 6, line 48, delete "$f_{TG}$" and substitute therefor --$f_{T_oG}$--

Col. 7, line 11, delete the word "characteristic", first occurrence, and substitute therefor the letter --K--

Col. 7, line 22, after the word constant, insert --and--

Col. 7, line 25, change "$(f_o-K/\alpha)$" to --$(f_o-\frac{K}{\alpha})$--

UNITED STATES PATENT OFFICE
CERTIFICATE OF CORRECTION

Patent No. 3,831,011  Dated August 20, 1974

Inventor(s) Jack R. Hulme   Page 2

It is certified that error appears in the above-identified patent and that said Letters Patent are hereby corrected as shown below:

Col. 7, line 31, change

"$(1-(f_o K/\alpha + k(T-T_o)/f_o)$" to $-- (1 - \frac{(f_o - \frac{K}{\alpha} + K(T-T_o))}{f_o}) --$

IN THE CLAIMS

Claim 5, line 5, after the word to, insert --said--

Signed and sealed this 31st day of December 1974.

(SEAL)
Attest:

McCOY M. GIBSON JR.  C. MARSHALL DANN
Attesting Officer    Commissioner of Patents